United States Patent [19]

Hughes et al.

[11] 4,025,822
[45] May 24, 1977

[54] TWO TO THREE-WIRE CONVERTER CIRCUIT

[76] Inventors: W. Taliaferro Hughes, 1519 Country Club Road, Wilmington, N.C. 20401; Stewart P. Barrett, Jr., P.O. Box 3612, 3417 Walton Way Extension, Augusta, Ga. 30903

[22] Filed: Aug. 5, 1975

[21] Appl. No.: 602,173

[52] U.S. Cl. .................................. 361/45; 361/77
[51] Int. Cl.² .......................................... H02H 3/14
[58] Field of Search ............ 317/18 A, 18 B, 18 R, 317/9 A, 9 AC, 46–48, 9 R; 324/133; 340/253 H

[56] References Cited

UNITED STATES PATENTS

| | | | |
|---|---|---|---|
| 2,870,380 | 1/1959 | Rocha | 317/9 A X |
| 2,999,189 | 9/1961 | Gerrard | 317/18 B |
| 3,313,960 | 4/1967 | Borys | 317/18 R X |
| 3,588,603 | 6/1971 | Siugantz | 317/9 R |
| 3,766,434 | 10/1973 | Sherman | 317/18 B X |
| 3,961,319 | 6/1976 | Asberry | 317/18 A X |

Primary Examiner—J. D. Miller
Assistant Examiner—Patrick R. Salce
Attorney, Agent, or Firm—Steele & Petock

[57] ABSTRACT

A two to three wire converter circuit is disclosed which provides a protective function for users when using power hand tools, appliances or any electrically operated device. Many alternating current electrical supplies provide a hot or high line and a neutral line. Many electrical devices, such as hand tools and appliances, are provided with a high line, neutral and a ground line connected to the housing of the device. The present invention enables the connection of the housing ground line or the housing to the neutral line. The neutral line of an alternating current supply is connected to ground. The present invention provides a circuit for sensing which line is the high line and which line is the neutral line of an electric supply and connecting these to the electrical device only if the neutral line of the supply is connected to the neutral line of the electrical device. This invention serves an essential function since a two-prong plug may be inserted into the conventional electrical supply outlet two ways, the correct way with the normally high sides being connected, or incorrectly with the high side of supply being connected to the neutral line of the electrical device.

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

10 Claims, 2 Drawing Figures

4,025,822

TWO TO THREE-WIRE CONVERTER CIRCUIT

BACKGROUND OF THE INVENTION

The present invention relates to a protective circuit apparatus in the form of a two to three wire converter circuit. More particularly, the present invention relates to a protective circuit apparatus in which power connection is made to an electrical device only if the high and neutral lines of an electrical supply are properly connected to the high and neutral lines, respectively, of the electrical device.

For a number of years, the accepted way of protecting against insulation failure in electrical devices has been grounding. This applies to all types of electrical devices from hand tools, such as electric drills and saws, to appliances, such as refrigerators and portable dishwashers. The grounding is intended to be carried out by providing an extra wire connected to the conductive parts of the electrical devices' housing. The wire runs through the cord to a third prong that slips into a grounded socket located adjacent the high and neutral sockets of an electrical supply outlet. In the case of insulation failure, for example in an electrical motor, the current runs from the windings at the motor through the motor housing to the electrical devices' housing. If a proper ground is provided for the electrical devices' housing, this current is harmlessly carried to ground until a fuse burns out or a circuit breaker trips.

However, it is estimated that fewer than 20% of all homes in the United States are equipped with receptacles that accept the three-prong plugs of electrical devices supplied with the third housing ground wire. Consequently, many home handymen and even some professionals clip off the third prong. In other cases, the housing ground wire of the electrical device may be broken in the electrical devices power cord or in an extension cord which may be used with the electrical device. The housing ground wire may also become disconnected at the connections. Under these circumstances, the user of the electrical device, whether it be a hand tool or some other appliance, will not be aware of the fact that the housing of the electrical device is not connected to ground. This will not become apparent until an insulation failure occurs and the housing or casing of the electrical device becomes electrically hot. At that point, it is too late since the user may be shocked, possibly resulting in other secondary injuries such as falling from a ladder, or even be electrocuted.

Even in the industrial setting where the electrical supply receptacles are provided with three sockets, one corresponding to ground, the user of an electrical device is not entirely safe in the absence of the present invention. For example, the housing ground wire in the cord of the electrical device or an extension cord may be broken. Furthermore, the ground connection to the ground socket of the electrical receptacle or outlet may be broken or may never have been properly connected. Again, the user of an electrical device connected to such a defective third wire ground system will not become aware of the defect until it is too late.

The present invention overcomes the above problems by enabling the connection of the housing or the housing ground wire to the neutral line of the electrical supply. The neutral line of an electrical supply is connected to ground. If a break or other discontinuity occurs in the neutral line, it becomes readily apparent to the user of the electrical device since power flow to the electrical device ceases.

SUMMARY OF THE INVENTION

An advantage of the present invention is that it enables the connection of the housing of an electrical device to the neutral line of an electrically disconnectable electrical device, which may, for example, be electrically connectable and disconnectable from an electrical supply by means of a conventional electrical plug.

Another advantage of the present invention is that it ensures that electrical power is supplied to an electrical device only if the neutral line of the electrical supply is connected to the normally neutral line of the electrical device.

Another advantage of the present invention is that it enables the provision of a ground to the housing of an electrical device even though the electrical outlets or receptacles in the building are the old style two socket receptacles. That is, an electrical ground may be provided to the housing of an electrical device even though no separate ground connection is provided to the electrical outlet receptacle.

Still another advantage of one embodiment of the present invention is that it provides a two-check system in which the condition of both the normally high and neutral lines are monitored to ensure that a proper condition for power flow exists.

Briefly, in accordance with the present invention, a two to three wire converter protective circuit is provided for use in adapting a disconnectable three wire system to a two wire electrical supply. The disconnectable three wire system may be any type of an electrical device having a third line or connection to a housing which is to be grounded. The electrical supply is of the conventional type, having a high and a neutral line. The present invention provides means for sensing the voltage on at least one of the high and neutral lines with respect to the housing of the electrical device, and means responsive to the sensing means for providing a closed circuit for power flow only if the neutral line of the three wire system is connected to the neutral line of the electrical supply.

In a preferred embodiment, means are provided to sense the voltage between the hot line and the case ground in order to close a circuit of power flow and also senses the condition between the normally neutral line and the housing of the electrical device in order to open a normally closed circuit of power flow if the normally neutral line is high.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
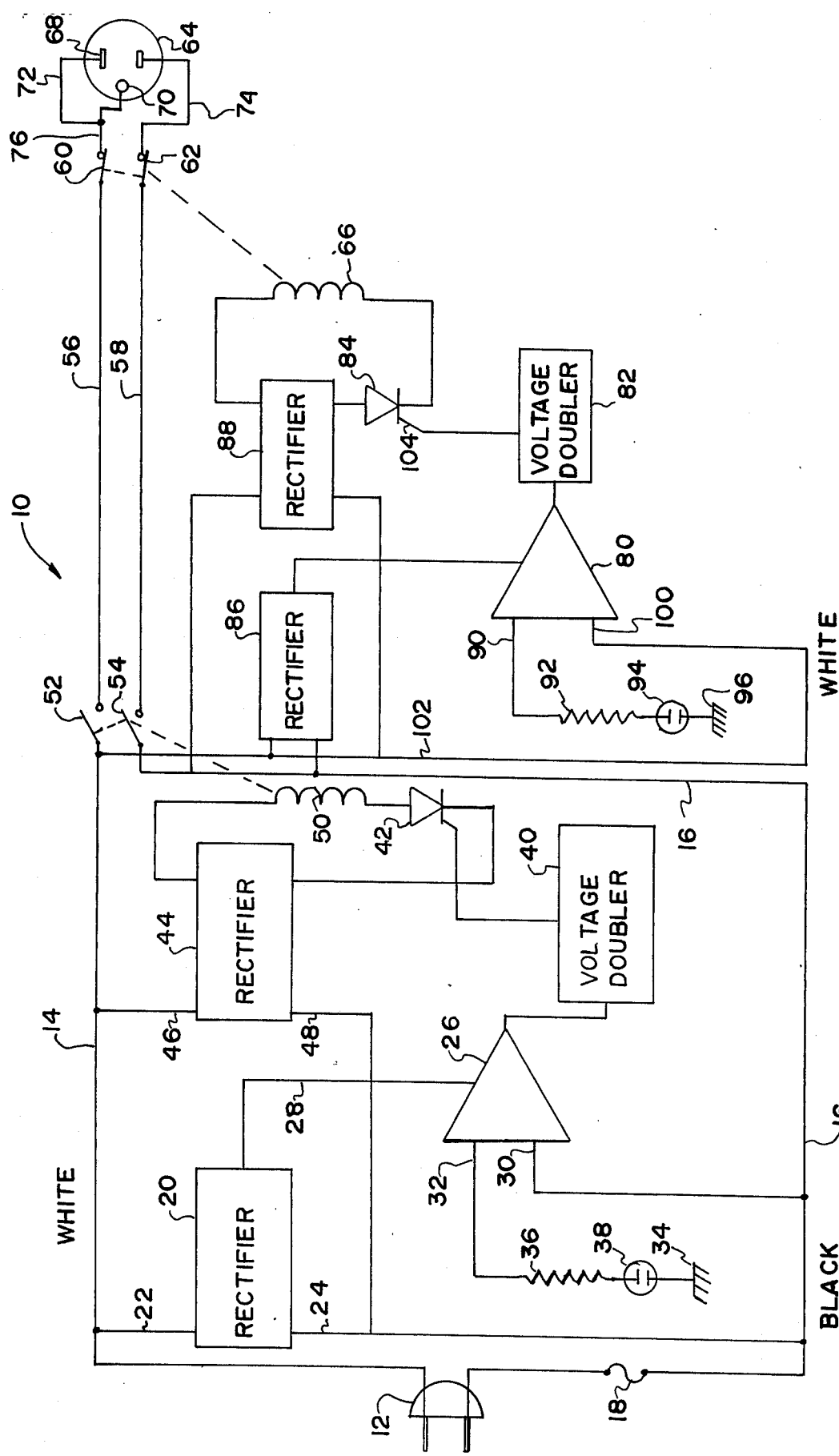
FIG. 1 is a schematic diagram, partially in block diagram form, of a preferred embodiment of the present invention.

Referring now to drawings in detail, there is shown in FIG. 1 a two to three wire converter circuit generally at 10. With respect to the discussion and terminology herein, it is understood that conventional electric supply systems comprise two or three wires. In a two-wire system, one of the wires is connected to the high side or hot side of the alternating current line. This wire is usually provided with insulation which is black. The other line of the two-wire system is usually referred to as the neutral line, and may be a wire having insulation which is white.

The three-wire electrical supply system is provided with the two wires of the two-wire system plus an additional ground wire. This ground wire is also connected to ground and duplicates the neutral or white line. With the use of the present invention, this additional ground wire is not needed. However, if it is available and is in good condition, it may be used as an additional safety factor.

Electrical devices, such as hand tools, appliances, and all other types of electrical apparatus, are provided with a normally high or hot line, and a normally neutral line. In addition, a connection for grounding purposes is usually provided to the conductive housing or casing. In discussing the present invention, the white line will be referred to as the neutral line, and the black line will be referred to as the high line, or hot line. It is therefore understood that if the plug is reversed, the neutral line may be high and the high line may be neutral or connected to ground. However, reference to the neutral line means the normally neutral line and reference to the high line means the normally high line. The present invention enables power flow to the load only when the plug is properly connected in the electrical outlet with the neutral line being connected to ground and the high line being connected to the alternating current potential.

Referring now to FIG. 1, there is shown a plug 12. Plug 12 is a two-prong plug adapted to be plugged into a conventional alternating current supply electrical outlet or receptacle. A neutral line 14 and a fused high line 16 are connected to plug 12. Line 16 is provided with fuse 18 connected in series therewith. A rectifier 20 is provided with its inputs 22 and 24 connected across lines 14 and 16. The output of rectifier 20 supplies a direct current source to amplifier 26 via line 28.

Common input terminal 30 of amplifier 26 is connected to normally high line 16. Line 16 is high when plug 12 is plugged into a receptacle in the desired or proper manner. Input terminal 32 of amplifier 26 is connected through resistor 36 and neon tube 38 to the housing of the electrical device to be provided with a ground through the neutral line 14.

Neon tube 38 is a breakdown device which has a relatively high breakdown potential. Neon tube 38 effectively isolates the input of amplifier 26 from transients and electrical noise signals which may be present on the line. However, when 110 to 120 volts is applied to line 16, amplifier 26 receives a difference potential across its input terminals 30 and 32 and provides an output signal to voltage doubler circuit 40. Voltage doubler circuit 40 effectively rectifies the output of amplifier 26 and doubles the voltage. However, it is understood that a voltage doubler is not necessary. A simple rectifier to protect the gate input of silicon controlled rectifier 42 will suffice. Furthermore, other types of switching circuits and devices may be used which would eliminate voltage doubler circuit 40.

Rectifier circuit 44 has its input terminals 46 and 48 connected across lines 14 and 16. The rectified output voltage of rectifier circuit 44 is provided across the series connected combination of relay coil 50 and the cathode-anode circuit of silicon controlled rectifier 42. When relay coil 50 is energized, it closes its contacts 52 and 54. The closing of relay contacts 52 and 54 provides power via lines 56 and 58 and normally closed contacts 60 and 62 to receptacle 64. Power is supplied through contacts 60 and 62 only if relay coil 66 is not energized. This will be discussed hereinafter.

The neutral socket 68 of receptacle 64 is connected to the ground socket 70 via line 72. These are both connected to neutral lines 56 and 14.

It is understood that receptacle 64 is not required, and in many cases it would not be used. In such a case, line 74 would be connected directly to the electric motor or other electrically functional part of the electrical device. Line 76 would be connected as the neutral return path for the electrically functional motor or part and to the housing or casing of the electrical device.

As indicated above, amplifier 26 provides an output to voltage doubler 40 and energizes relay coil 50 closing contacts 52 and 54 when normally high line 16 is high or has the normal alternating current voltage on it. If plug 12 is plugged in backwards, neutral line 14 becomes high and high line 16 becomes low or neutral. In this case, a sufficient voltage difference is not felt across input terminals 30 and 32 of amplifier 26 in order to gate on silicon controlled rectifier 42 via voltage doubler 40. Since relay coil 50 is not energized, relay contacts 52 and 54 remain open. Since no power is provided to the electrical device, the operator or user immediately realizes that plug 12 is backwards in the electrical supply outlet receptacle (not shown). An indicator of an improper connection may be provided such as neon tube 206 in FIG. 2. The operator or user then merely reverses plug 12 in the supply receptacle. Once the plug 12 is reversed, the difference potential appears across the input terminals of amplifier 26 resulting in the energization of relay coil 50 and the closing of contacts 52 and 54.

In order to avoid any possibility of relay contacts 52 and 54 being bounced closed or of a stray potential somehow energizing amplifier 26, a second sensing circuit is provided which senses the condition of the normally neutral line 14. This second sensing circuit for sensing the condition of neutral line 14 is comprised of amplifier 80, voltage doubler 82, silicon controlled rectifier 84, relay coil 66 and rectifiers 86 and 88.

Input terminal 90 of amplifier 80 is connected through resistor 92 and neon tube 94 to the conductive housing 96 of the electrical device. It is understood that any suitable breakdown device, such as a solid state breakdown device, may be used in place of neon tubes 94 and 38. Any suitable breakdown device that will preclude the false triggering of amplifiers 26 and 80 in response to transients and noise voltages are suitable. Input 100 of amplifier 80 is connected to neutral line 14 via line 102. Amplifier 80 receives a direct current supply voltage from rectifier 86. The input of rectifier 86 is connected across lines 16 and 102.

If neutral lines 14 and 102 have the alternating voltage on them, or, in other words, are hot, amplifier 80 will produce an output which is applied to voltage doubler circuit 82. Voltage doubler circuit 82 triggers silicon controlled rectifier 84 via gate terminal 104. The triggering of silicon controlled rectifier 84 causes relay coil 66 to be energized causing the opening of contacts 60 and 62. Therefore, if plug 12 is inserted in the electrical supply receptacle improperly so that the neutral line 14 becomes high, relay coil 66 will open contacts 60 and 62 in response to amplifier 80 detecting this condition.

It is understood that other types of switching devices may be used in place of silicon controlled rectifiers 42 and 84. Furthermore, other types of switching circuits may be used in place of the relays disclosed herein.

Figure 2:
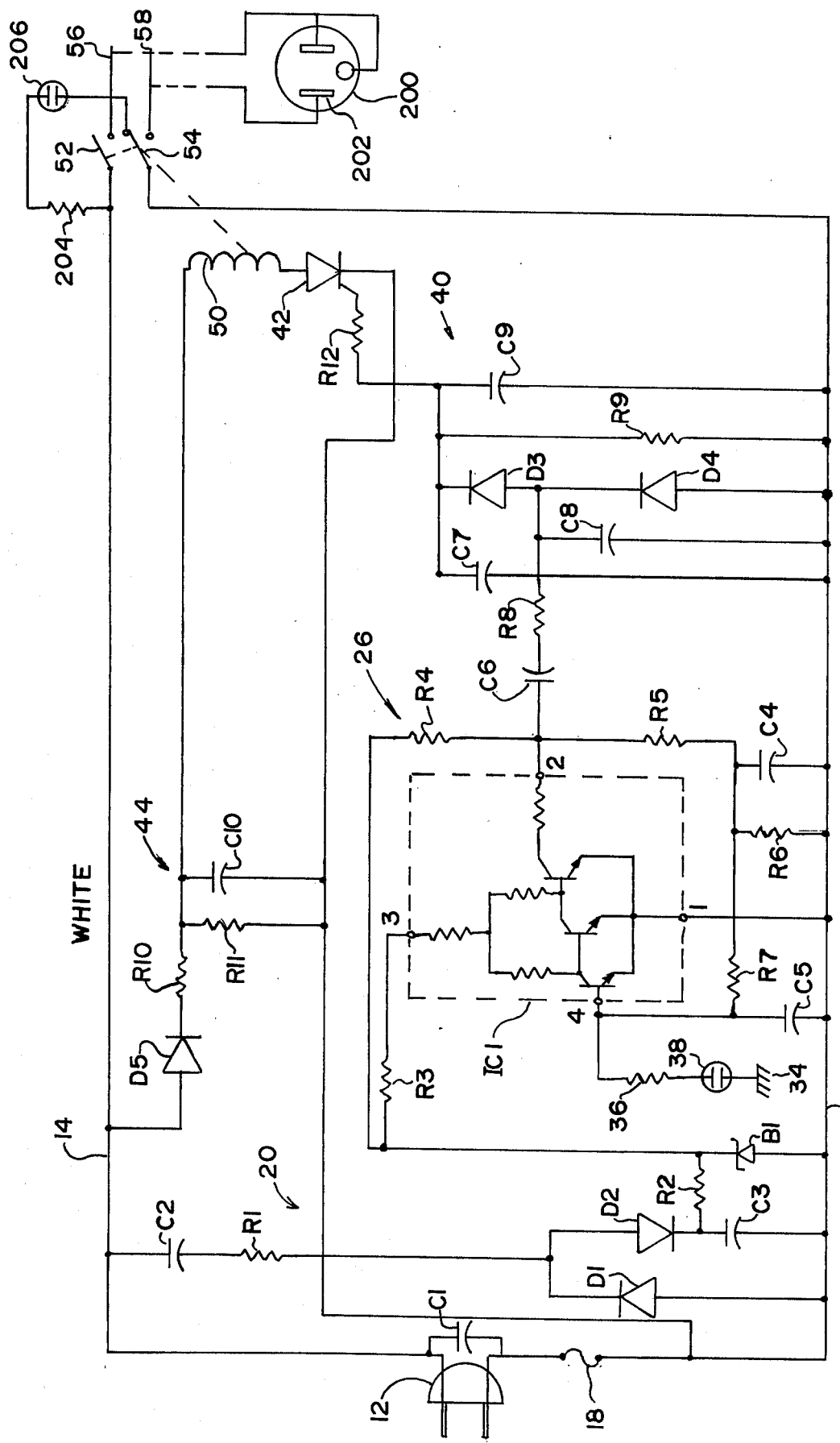
FIG. 2 is a schematic diagram of a portion of FIG. 1 which may be used as a complete unit.

Referring now to FIG. 2, there is shown a detailed schematic circuit diagram of one specific preferred embodiment of the invention. The circuit schematically shown in FIG. 2 corresponds approximately to the first half of the circuit shown in FIG. 1. The second half of the circuitry of FIG. 1 may be substantially identical except for the wiring changes as indicated in FIG. 1. However, as shown in FIG. 2 and as indicated with respect to FIG. 1, the circuitry of FIG. 2 may be used as a complete two to three wire converter in itself. However, the provision of the second sensing circuit which feeds amplifier 80 in FIG. 1 provides additional reliability.

Referring now to FIG. 2, wherein like subunits are given numbers the same as in FIG. 1, there is shown a plug 12. Lines 14 and 16 are connected to plug 12. Line 16 is fused by fuse 18. Capacitor C1 is a filter capacitor for removing noise from the incoming power. Rectifier or direct current power supply 20 is connected across lines 14 and 16. Rectifier 20 is comprised of capacitor C2, resistor R1, diodes D1 and D2, filter capacitor C3, resistor R2 and zener diode B1.

The output of rectifier or direct current power supply 20 is applied to amplifier 26 through a network comprised of resistors R3, R4, R5, R6 and R7, and capacitors C4 and C5, as shown in FIG. 2. Amplifier 26 may be preferably an integrated circuit designated as IC1 and having input terminals 1, 2, 3 and 4. The integrated circuit IC1 may be one manufactured by Motorola and designated as HEP C6010. However, it is understood that other equivalent amplifiers may be used and that a discrete transistor amplifier circuit may also be used. Terminal 1 of integrated circuit amplifier IC1 is connected to the normally hot line 16. Input terminal 4 is connected through resistor 36 and neon bulb 38 to the housing of the electrical device 34 as described with respect to FIG. 1. Terminals 2 and 3 of integrated circuit IC1 are connected through resistors R3 and R4 to the direct current supply provided by rectifier 20. The output of integrated circuit amplifier IC1 appears at terminal 2 and is fed to voltage doubler circuit 40 comprised of capacitors C6, C7, C8 and C9, resistors R8 and R9, and diodes D3 and D4.

Rectifier or direct current power supply 44 is comprised of diode D5, resistors R10 and R11, and capacitor C10. The input of rectifier 44 is connected across normally neutral line 14 and normally high line 16.

Relay coil 50 and the cathode-anode circuit of silicon controlled rectifier 42 are connected in series across the output of rectifier 44. The output of voltage doubler circuit 40 is supplied via resistor R12 to the gate terminal of silicon controlled rectifier 42. Relay coil 50 operates relay contacts 52 and 54 as described with respect to FIG. 1. Lines 56 and 58 may be used as shown with respect to FIG. 1. Alternatively, lines 56 and 58 may be connected directly to a receptacle 200 as shown by the dotted lines in FIG. 2. In other words, the ground and neutral terminals of the receptacle 200 would be connected to line 56. The high terminal 202 would be connected to the normally high line 58. Due to the operation of the circuit as shown in FIG. 2, line 58 would always be the high line or else it would not be energized at all.

A resistor 204 and neon bulb 206 are shown connected between line 14 and line 16, when relay coil 50 is not energized, via contact 54. Therefore, neon tube 206 is energized when plug 12 is improperly plugged into an electrical supply outlet due to the fact that the alternating current potential is applied across lines 14 and 16, but relay coil 50 would not be energized due to the improper connection. Therefore, neon tube 206 provides an indication of the fault condition.

By way of specific example, but not by way of limitation, the following component values are provided.

| | |
|---|---|
| R1 | 2.2 K, 2 watts |
| R2 | 120 ohms |
| R3 | 2200 ohms |
| R4 | 8200 ohms |
| R5 | 3900 K ohms |
| R6 | 15 K ohms |
| R7 | 3.9 K ohms |
| Resistor 36 | 88 Meg ohms |
| R8 | 1 K ohms |
| R9 | 39 K ohms |
| R10 | 470 ohms, 2 watts |
| R11 | 10 K ohms, 10 watts |
| R12 | 650 ohms |
| C1 | .33 microfarads, 600 volts |
| C2 | .33 microfarads, 600 volts |
| C3 | 1,000 microfarads, 25 volts |
| C4 | 100 microfarads, 6 volts |
| C5 | .0033 microfarads |
| C6 | 2 microfarads, 25 volts |
| C7 and C8 | .01 microfarads |
| C9 | 20 microfarads |
| C10 | 3 microfarads, 150 volts |
| D1, D2, D3, D4 and D5 | Motorola HEP 170 diodes |
| Neon Tubes 38 and 206 | NE2H neon glow tubes |
| B1 | International Rectifier's Z1108-C, 8.2 volt; 1 watt zener diode |

The invention has been described and one specific embodiment of carrying out the invention has been described in detail including circuit component values. However, it will be apparent to those skilled in the art that numerous variations and modifications may be made to the structure and circuitry disclosed herein. For example, various other types of rectifier and amplifier circuits may be used. Furthermore, various other types of relays and switching circuits may be used in the present invention. The voltage doubler circuit may be varied in many respects or it may be even eliminated, depending upon other circuit modifications.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. Protective circuit apparatus for use in adapting a disconnectable electrical device to a two-wire electrical supply having a high and a neutral line wherein a housing of an electrical device may be connected to said neutral line, said protective circuit comprising: means for sensing the voltage on the high and neutral lines with respect to the potential of the housing of the electrical device, said sensing means including a first means for sensing the voltage between the normally high line and the housing of the electrical device and a second means for sensing the voltage between the normally neutral line and the housing of the electrical device, said first and second sensing means providing a first and a second output signal, respectively, and means responsive to said sensing means for providing a closed circuit condition for power flow only if the neutral line of the electrical device is connected to the neutral line of the electrical supply, said means for providing a closed circuit condition receiving said first and second output signals, said means for providing a closed circuit condition including a first switch means operative in response to a signal output from said first sensing means to close the path of power flow when said first sensing means detects that the normally high line is high with respect to the housing of the electrical device by a predetermined voltage and a second switch means operative in response to a signal output from said second sensing means to open the path of power flow if the normally neutral line is high with respect to the housing of the electrical device by a predetermined voltage.

2. A protective circuit apparatus in accordance with claim 1 wherein said first and second switch means are relays.

3. Protective circuit apparatus in accordance with claim 1 wherein said means for sensing the voltage comprises an amplifier means, one input of said amplifier means being connected to the housing of the electrical device through a voltage breakdown device and a second input terminal being connected to one of the high and neutral lines of the electrical supply.

4. Protective circuit apparatus in accordance with claim 3 wherein said voltage breakdown device comprises a neon tube.

5. Apparatus for converting a two-wire electrical supply output having a high and a neutral line for use with a plug connectable electrical device using a three-wire system, one of said three wires being a ground wire connected to a housing of said device, comprising:

amplifier means, said amplifier means input being connected between the housing ground of said electrical device and the high line of said electrical supply, said amplifier means being insensitive below a predetermined threshold level input and producing an output when the input exceeds said predetermined threshold level;

relay means including coil means and a first contact connected in series with said neutral line, and a second contact connected in series with said high line; and electronic switch means connected in series with said relay coil and being operative to energize said relay means in response to the output signal from said amplifier means whereby upon energization of said relay, the high and neutral lines of the electrical supply are connected by said relay contacts to the high and neutral lines of said electrical device, respectively, the ground wire of said electrical device being electrically connected to the neutral wire.

6. Apparatus in accordance with claim 5 including a second amplifier means, said second amplifier means input being connected between the housing ground of said electrical device and the normally neutral line of said electrical supply, said second amplifier means being insensitive below a predetermined threshold level input and producing an output when the input exceeds said predetermined threshold level;

second relay means including coil means and a first contact connected in series with said neutral line, and a second contact connected in series with said high line; and second electronic switch means connected in series with said second relay coil and being operative to energize said second relay means in response to an output signal from said second amplifier means whereby said second relay remaining de-energized allows the high and neutral lines of the electrical supply to be connected by said second relay contacts to the high and neutral lines of said electrical device, respectively, the ground wire of said electrical device being electrically connected to the neutral wire.

7. Apparatus in accordance with claim 5 wherein at least one input terminal of said amplifier means is connected through a voltage breakdown device.

8. Apparatus in accordance with claim 7 wherein said voltage breakdown device is a neon tube.

9. Apparatus in accordance with claim 5 including a voltage doubler means connected between the output of said amplifier means and said electronic switch means.

10. Apparatus in accordance with claim 9 wherein said electronic switch means comprises a silicon controlled rectifier.

* * * * *